United States Patent
Yonezawa et al.

(10) Patent No.: US 11,849,736 B2
(45) Date of Patent: Dec. 26, 2023

(54) TEA AROMATIZING COMPOSITION HAVING FLORAL AROMA

(71) Applicant: SUNTORY HOLDINGS LIMITED, Osaka (JP)

(72) Inventors: Daisaku Yonezawa, Kanagawa (JP); Makoto Otsuka, Kyoto (JP); Takashi Mukai, Kyoto (JP); Takeshi Nakajima, Kyoto (JP); Keita Kikuchi, Kyoto (JP); Yuji Hirayama, Kanagawa (JP); Taisuke Osanai, Kanagawa (JP); Taishu Hamaba, Kanagawa (JP)

(73) Assignee: SUNTORY HOLDINGS LIMITED, Osaka (JP)

(*) Notice: Subject to any disclaimer, the term of this patent is extended or adjusted under 35 U.S.C. 154(b) by 148 days.

(21) Appl. No.: 17/599,246

(22) PCT Filed: Mar. 27, 2020

(86) PCT No.: PCT/JP2020/013891
§ 371 (c)(1),
(2) Date: Sep. 28, 2021

(87) PCT Pub. No.: WO2020/203717
PCT Pub. Date: Oct. 8, 2020

(65) Prior Publication Data
US 2022/0183314 A1  Jun. 16, 2022

(30) Foreign Application Priority Data

Mar. 29, 2019  (JP) ................................. 2019-068537

(51) Int. Cl.
*A23F 3/42* (2006.01)
*A23F 3/16* (2006.01)

(52) U.S. Cl.
CPC ................ *A23F 3/426* (2013.01); *A23F 3/16* (2013.01)

(58) Field of Classification Search
CPC .................................. A23F 3/16; A23F 3/426
See application file for complete search history.

(56) References Cited

U.S. PATENT DOCUMENTS

| | | | |
|---|---|---|---|
| 3,966,986 A | 6/1976 | Hunter et al. | |
| 4,265,923 A * | 5/1981 | Sprecker | ................ A24B 15/34 |
| | | | 426/538 |
| 2009/0029003 A1 | 1/2009 | Bagaria et al. | |
| 2013/0156929 A1 | 6/2013 | Sasame et al. | |
| 2022/0330579 A1* | 10/2022 | Nakajima | ................ A23L 2/39 |

FOREIGN PATENT DOCUMENTS

| | | |
|---|---|---|
| GB | 1306017 A | 2/1973 |
| JP | 2005-143467 A | 6/2005 |
| JP | 2006-75112 A | 3/2006 |
| JP | 2009-508477 A | 3/2009 |
| JP | 2016-55 A | 1/2016 |
| JP | 2016-15924 A | 2/2016 |
| SG | 121100 A1 | 4/2006 |
| WO | 2012/029132 A1 | 3/2012 |

OTHER PUBLICATIONS

Xu Yong-Quan et al: "Improving the quality of fermented black tea juice with oolong tea infusion", Journal of Food Science and Technology, Springer (India) Private Ltd, India, vol. 54, No. 12, Sep. 13, 2017 (Sep. 13, 2017), pp. 3908-3916, XP036341405; Cited in Extended European Search Report dated Nov. 24, 2022. (9 pages).

Christian Schuh et al: "Characterization of the Key Aroma Compounds in the Beverage Prepared from Darjeeling Black Tea: Quantitative Differences between Tea Leaves and Infusion", Journal of Agricultural and Food Chemistry, vol. 54, No. 3, Feb. 1, 2006 (Feb. 1, 2006), pp. 916-924, XP055364876; Cited in Extended European Search Report dated Nov. 24, 2022. (9 pages).

The Extended European Search Report dated Nov. 24, 2022, issued in counterpart EP application No. 20785417.5. (10 pages).

English Translation of International Search Report dated Jun. 23, 2020, issued in counterpart Application No. PCT/JP2020/013891. (2 pages).

Owuor, P. O. et al., "Effects of Fermentation under Enriched Oxygen Atmosphere on Clonal Black Tea Aroma Complex", Food Sci. Technol. Int. Tokyo, 1998, vol. 4, No. 2, pp. 136-139; Cited in ISR. (4 pages).

\* cited by examiner

*Primary Examiner* — Anthony J Weier
(74) *Attorney, Agent, or Firm* — WHDA, LLP

(57) ABSTRACT

An object of the present invention is to provide an aromatizing material having excellent floral aroma. The tea aroma composition including linalool, geraniol, and 2-methylbutanal, and has a weight ratio of 2-methylbutanal content to total linalool and geraniol content which is adjusted to be in the range of from 0.010 to 0.215.

5 Claims, No Drawings

TEA AROMATIZING COMPOSITION HAVING FLORAL AROMA

TECHNICAL FIELD

The present invention relates to a tea aroma composition, and more particularly to a tea aroma composition having floral aroma.

BACKGROUND ART

Tea beverages produced from processed tea leaves are widely consumed not only in Japan but also in other countries throughout the world. Some tea beverages are sold in the form of packaged beverages which are beverages sterile packed in packages such as PET bottles or cans, or other tea beverages are sold in the form of tea beverage powders which are made from dried and pulverized beverages and are intended to be dissolved in cold or hot water, etc. before drinking. In recent years, different aromatizing materials have been used in various types of tea beverages for the purpose of further improving the aroma of tea beverages. In particular, there is a strong demand from tea beverage manufacturers to develop an aromatizing material with excellent aroma.

It is known that aromatizing materials used in tea beverages are produced using a steam distillation method. For example, there is disclosed a method intended for enhancing the aroma of an aromatizing material, the method comprising subjecting tea leaves used as a source ingredient to treatment with tannase and a glucoside-splitting enzyme before steam distillation (PTL 1). Also, there is disclosed a process for producing a tea leaf product, the process comprising: collecting volatiles emitted from fresh tea leaves while drying the fresh tea leaves using a low convection dryer; and condensing the volatiles to obtain an aromatizing material as a condensate (PTL 2).

Further, various techniques have been developed to improve the aroma of beverages per se regardless of the use of an aromatizing material. For example, there are disclosed a green tea beverage comprising a reducing sugar and a non-reducing sugar, and also comprising geraniol and furfural at a specified ratio (PTL 3), as well as a beverage comprising monoterpene alcohols composed of linalool, geraniol and β-citronellol, and 4-mercapto-4-methylpentan-2-one at specified concentrations (PTL 4). Furthermore, there is disclosed a composition for use in tea beverages, the composition comprising soluble tea solids, and aroma components composed of 2-phenyl ethanol and linalool (PTL 5).

CITATION LIST

Patent Literatures

PTL 1: Japanese Unexamined Patent Application Publication No. JP 2006-75112
PTL 2: Japanese Translation of PCT International Publication No. JP 2009-508477
PTL 3: International Patent Publication No. WO 2012/029132
PTL 4: Japanese Unexamined Patent Application Publication No. JP 2016-55
PTL 5: Japanese Unexamined Patent Application Publication No. JP 2016-15924

SUMMARY OF INVENTION

Technical Problem

Tea beverages, inter alia high-grade green tea beverages, have characteristic aromas—one of those characteristic aromas is called "floral aroma". However, there has hitherto been almost no known aromatizing material that is excellent in aroma, particularly in floral aroma. Thus, an object of the present invention is to provide an aromatizing material having excellent floral aroma.

Solution to Problem

The present inventors have made intensive studies to achieve the aforementioned object, and as a result found that while it has conventionally been believed that linalool and geraniol have the most significant effect on the floral aroma of tea, excellent floral aroma more characteristic of high-grade tea leaves can be produced by incorporating 2-methylbutanal in combination with these two components. Further, the inventors found that an aromatizing material having more excellent floral aroma can be produced by adjusting the ratio of 2-methylbutanal content to total linalool and geraniol content to be within a specified range. Based on these findings, the inventors have completed the present invention.

The present invention is directed, but not limited, to the following.

(1) A tea aroma composition comprising linalool, geraniol, and 2-methylbutanal, and having a weight ratio of 2-methylbutanal content to total linalool and geraniol content of from 0.010 to 0.215.
(2) The composition as set forth in (1), further comprising 2,4-heptadienal.
(3) The composition as set forth in (1) or (2), further comprising at least one aroma component selected from the group consisting of α-ionone, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol, and indole.
(4) A beverage or food comprising the composition as set forth in any one of (1) to (3).
(5) The beverage or food as set forth in (4), wherein the beverage or food is a beverage.

Advantageous Effects of Invention

According to the present invention, an aromatizing material having excellent floral aroma can be provided. The tea aroma composition of this invention can be used as a source material for making beverages and can effectively impart the excellent floral aroma of tea leaves to beverages in general. The tea aroma composition of this invention is particularly effective in imparting the excellent floral aroma of tea leaves to packaged beverages which are beverages packed in PET bottles, cans or other packages.

Further, the tea aroma composition of the present invention can be used not only in beverages but also in foods. In recent years, there has been a tendency toward an increase in the number and types of tea flavored foods. By using the tea aroma composition of this invention, the excellent floral aroma of tea leaves can be effectively imparted to, for example, confectionary foods, such as cakes, sponge cakes, candies, cookies, jellies, and puddings.

DESCRIPTION OF EMBODIMENTS (Tea Aroma Composition)

Hereunder, the tea aroma composition of the present invention will be described. Unless otherwise specified, the terms "ppm", "ppb" and "wt. %" as used herein refer respectively to ppm, ppb, and wt. % on a weight/volume (w/v) basis.

One embodiment of the present invention is directed to a tea aroma composition comprising linalool, geraniol, and 2-methylbutanal, and having a weight ratio of 2-methylbutanal content to total linalool and geraniol content of from 0.010 to 0.215. By adopting the aforementioned constituent elements, the tea aroma composition can exhibit excellent floral aroma. As referred to herein, the term "floral aroma" refers to an aroma that combines a refreshing aroma like lily of the valley with a rose-like sweet scent.

As referred to herein, the term "tea aroma composition" refers to a composition comprising an aroma component obtained from tea leaves used as a source material ("tea leaf-derived aroma component"). In this invention, the tea aroma composition is generally used for dilution or dispersion in products of interest, such as beverages and foods, and can impart the aroma derived from tea leaves to the products of interest. Therefore, the tea aroma composition of this invention can also be referred to as a tea aromatizing composition. The form of the tea aroma composition of this invention is not particularly limited, but is generally liquid.

The tea leaves that can be used as a source material in the present invention are leaves obtained from plants belonging to the family Theaceae, genus Camella (e.g., Camellia sinensis (L) O. Kuntze). In this invention, green tea leaves are preferably used. In general, during the process of making green tea leaves, freshly picked fresh tea leaves are first processed into Ara-cha (crude tea) through taking the following steps in this order: steaming, rough rolling, rolling, medium rolling, fine rolling, and drying. Then, Ara-cha is further processed into Shiage-cha (finished tea) through taking the following steps in this order: sieving, cutting, firing/drying, sorting, and blending. As referred to in this invention, the term "tea leaves" refers to tea leaves obtained by processing fresh tea leaves from plants of the family Theaceae, genus Camellia through taking the aforementioned steps, and examples thereof include all types of steamed, non-fermented tea leaves, such as Ara-cha, Sencha (brewed green tea), Gyokuro (refined green tea), Kabuse-cha (shaded green tea), Kukicha (twig tea), Karigane (stems of Gyokuro and high-grade Sencha), Tenbone (roasted Tencha stems), Tencha (non-ground tea leaves used for Matcha), Bancha (coarse green tea), and Houji-cha (roasted green tea). In this invention, two or more types of tea leaves may be used in a blended form. In this invention, stems of Kukicha, Karigane, Tenbone, or the like are particularly preferably used.

The tea aroma composition of the present invention comprises linalool, geraniol, and 2-methylbutanal. Linalool is a type of monoterpene alcohol represented by the molecular formula $C_{10}H_{18}O$, and is known to have an aroma like lily of the valley, lavender, and bergamot. Geraniol is a type of linear monoterpenoid represented by the chemical formula $C_{10}H_{17}OH$. It is known that geraniol is found in essential oils like rose oil, palmarosa oil, and citronella oil, and has a rose-like aroma. 2-Methylbutanal is a type of acyclic aliphatic aldehyde represented by the molecular formula $C_5H_{10}O$. It is known that 2-methylbutanal is naturally occurring in fruits and also found in roasted or cooked peanuts, and that this component has a burnt odor.

In the tea aroma composition of the present invention, the weight ratio of 2-methylbutanal content to total linalool and geraniol content (2-methylbutanal/(linalool+geraniol)) is in the range of from 0.010 to 0.215. When 2-methylbutanal is present in combination with linalool and geraniol at a weight ratio within the aforementioned range, the tea aroma composition can exhibit particularly excellent floral aroma. The weight ratio of 2-methylbutanal content to total linalool and geraniol content in the tea aroma composition of this invention is preferably not less than 0.012, not less than 0.015, not less than 0.018, not less than 0.020, not less than 0.022, not less than 0.025, not less than 0.028, not less than 0.030, or not less than 0.035. Also, the weight ratio of 2-methylbutanal content to total linalool and geraniol content in the tea aroma composition of this invention is preferably not more than 0.210, not more than 0.200, not more than 0.190, not more than 0.180, not more than 0.170, not more than 0.165, not more than 0.160, not more than 0.150, or not more than 0.140. Typically, the weight ratio of 2-methylbutanal content to total linalool and geraniol content in the tea aroma composition of this invention is in the range of preferably from 0.015 to 0.210, more preferably from 0.020 to 0.200, still more preferably from 0.025 to 0.180.

The linalool content in the tea aroma composition of the present invention is not particularly limited, and is for example not less than 50 ppb, preferably not less than 100 ppb, not less than 500 ppb, not less than 1000 ppb, not less than 2000 ppb, not less than 5000 ppb, not less than 10000 ppb, not less than 12000 ppb, not less than 15000 ppb, not less than 20000 ppb, not less than 25000 ppb, not less than 30000 ppb, not less than 40000 ppb, not less than 50000 ppb, not less than 100000 ppb, 120000 ppb, not less than 150000 ppb, or not less than 200000 ppb. When the linalool content falls within the aforementioned range, the tea aroma composition can exhibit excellent floral aroma. The upper limit of the linalool content in the tea aroma composition of this invention is not particularly limited. For example, the linalool content is not more than 1000000 ppb, not more than 800000 ppb, or not more than 500000 ppb. Thus, the linalool content in the tea aroma composition of this invention is typically in the range of from 50 to 1000000 ppb, preferably from 5000 to 800000 ppb, more preferably from 10000 to 800000 ppb.

The geraniol content in the tea aroma composition of the present invention is not particularly limited, and is for example not less than 15 ppb, preferably not less than 30 ppb, not less than 100 ppb, not less than 500 ppb, not less than 1000 ppb, not less than 3000 ppb, not less than 5000 ppb, not less than 7000 ppb, not less than 10000 ppb, not less than 15000 ppb, not less than 20000 ppb, not less than 30000 ppb, not less than 50000 ppb, not less than 60000 ppb, not less than 70000 ppb, not less than 80000 ppb, or not less than 90000 ppb. When the geraniol content falls within the aforementioned range, the tea aroma composition of this invention can exhibit more excellent floral aroma. The upper limit of the geraniol content in the tea aroma composition of this invention tea aroma composition is not particularly limited. For example, the geraniol content is not more than 1000000 ppb, not more than 800000 ppb, or not more than 500000 ppb. Thus, the geraniol content in the tea aroma composition of this invention is typically in the range of from 30 to 1000000 ppb, preferably from 3000 to 800000 ppb, more preferably from 5000 to 800000 ppb.

The content ratio of linalool to geraniol in the tea aroma composition of the present invention is not particularly limited. The content ratio of linalool to geraniol (linalool: geraniol) on a weight basis is for example in the range of from 1:50 to 50:1, preferably from 1:10 to 20:1, more preferably from 1:5 to 10:1, still more preferably from 1:1 to 5:1.

The total linalool and geraniol content in the tea aroma composition of the present invention is not particularly limited, and is for example not less than 65 ppb, preferably not less than 100 ppb, not less than 500 ppb, not less than 1000 ppb, not less than 3000 ppb, not less than 5000 ppb, not less than 7000 ppb, not less than 10000 ppb, not less than 15000 ppb, not less than 20000 ppb, not less than 25000 ppb, not less than 30000 ppb, not less than 50000 ppb, not less than 70000 ppb, not less than 100000 ppb, not less than 150000 ppb, not less than 200000 ppb, not less than 250000 ppb, or not less than 300000 ppb. The upper limit of the total linalool and geraniol content in the tea aroma composition of this invention is not particularly limited. For example, the total linalool and geraniol content is not more than 2000000 ppb, not more than 15000000 ppb, or not more than 1000000 ppb. Thus, the total linalool and geraniol content in the tea aroma composition of this invention is typically in the range of from 65 to 2000000 ppb, preferably from 7000 to 15000000 ppb, more preferably from 10000 to 15000000 ppb.

The 2-methylbutanal content in the tea aroma composition of the present invention is not particularly limited, and is for example not less than 1 ppb, preferably not less than 5 ppb, not less than 10 ppb, not less than 50 ppb, not less than 100 ppb, not less than 200 ppb, not less than 500 ppb, not less than 1000 ppb, not less than 1200 ppb, not less than 1500 ppb, not less than 2000 ppb, not less than 3000 ppb, not less than 3500 ppb, not less than 5000 ppb, not less than 10000 ppb, not less than 12000 ppb, not less than 15000 ppb, or not less than 20000 ppb. When 2-methylbutanal is present in an amount within the aforementioned range in combination with linalool and geraniol, the tea aroma composition of this invention can exhibit more excellent floral aroma. The upper limit of the 2-methylbutanal content in the tea aroma composition of this invention is not particularly limited. For example, the 2-methylbutanal content is not more than 80000 ppb, not more than 60000 ppb, or not more than 500000 ppb. Thus, the 2-methylbutanal content in the tea aroma composition of this invention is typically in the range of from 1 to 80000 ppb, preferably from 500 to 60000 ppb, more preferably from 1500 to 60000 ppb.

The tea aroma composition of the present invention can further comprise 2,4-heptadienal. 2,4-Heptadienal is a type of terpene aldehyde represented by the molecular formula $C_7H_{10}O$, and is known to smell like liver or fish.

The 2,4-heptadienal content in the tea aroma composition of the present invention is not particularly limited, and is for example not less than 0.001 ppb, preferably not less than 0.003 ppb, not less than 0.01 ppb, not less than 0.1 ppb, not less than 1 ppb, not less than 10 ppb, not less than 20 ppb, not less than 50 ppb, not less than 70 ppb, not less than 100 ppb, not less than 150 ppb, not less than 200 ppb, not less than 250 ppb, not less than 300 ppb, not less than 500 ppb, not less than 700 ppb, not less than 1000 ppb, or not less than 1500 ppb. When 2,4-heptadienal is present in an amount within the aforementioned range in combination with the aroma components mentioned above, the tea aroma composition of this invention can exhibit more excellent floral aroma. The upper limit of the 2,4-heptadienal content in the tea aroma composition of this invention is not particularly limited. For example, the 2,4-heptadienal content is not more than 10000 ppb, not more than 8000 ppb, or not more than 5000 ppb. The 2,4-heptadienal content in the tea aroma composition of this invention is typically in the range of from 0.001 to 10000 ppb, preferably from 1 to 8000 ppb, more preferably from 50 to 8000 ppb.

The tea aroma composition of the present invention can further comprise, in addition to linalool, geraniol, 2-methylbutanal, and 2,4-heptadienal as mentioned above, at least one aroma component selected from the group consisting of α-ionone, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol, and indole. When such aroma components are incorporated in the tea aroma composition of this invention, the tea aroma composition can exhibit still more excellent floral aroma.

The α-ionone content in the tea aroma composition of the present invention is for example in the range of from 0.0001 to 100 ppm, preferably from 0.001 to 10 ppm, more preferably from 0.01 to 1 ppm. The β-cyclocitral content in the tea aroma composition of this invention is for example in the range of from 0.0001 to 100 ppm, preferably from 0.001 to 10 ppm, more preferably from 0.01 to 1 ppm. The (z)-3-hexenol content in the tea aroma composition of this invention is for example in the range of from 0.01 to 100 ppm, preferably from 0.1 to 50 ppm, more preferably from 1 to 20 ppm. The 1-penten-3-ol content in the tea aroma composition of this invention is for example in the range of from 0.01 to 100 ppm, preferably from 0.1 to 50 ppm, more preferably from 1 to 20 ppm. The nerolidol content in the tea aroma composition of this invention is for example in the range of from 0.0001 to 100 ppm, preferably from 0.001 to 50 ppm, more preferably from 0.01 to 20 ppm. The hexanal content in the tea aroma composition of this invention is for example in the range of from 0.001 to 100 ppm, preferably from 0.01 to 50 ppm, more preferably from 0.1 to 20 ppm. The (E)-linalool oxide content in the tea aroma composition of this invention is for example in the range of from 0.01 to 1000 ppm. The β-myrcene content in the tea aroma composition of this invention is for example in the range of from 0.01 to 1000 ppm. The trans-β-ocimene content in the tea aroma composition of this invention is for example in the range of from 0.01 to 1000 ppm. The L-α-terpineol content in the tea aroma composition of this invention is for example in the range of from 0.01 to 1000 ppm. The methyl salicylate content in the tea aroma composition of this invention is for example in the range of from 0.01 to 1000 ppm. The benzyl alcohol content in the tea aroma composition of this invention is for example in the range of from 0.01 to 1000 ppm. The indole content in the tea aroma composition of this invention is for example in the range of from 0.01 to 1000 ppm.

In the present invention, the contents of linalool, geraniol, 2-methylbutanal, and 2,4-heptadienal in the tea aroma composition can be measured using gas chromatography (GC). As a gas chromatographic analysis system, Flash GC Nose HERACLES II (produced by Alpha M.O.S. Japan K.K.) can be used. To be specific, the contents of the above aroma components can be measured under the conditions detailed below.

Gas chromatography system: Flash GC Nose HERACLES 11
Column 1: MXT-5 (slight polarity, 10 m, 180 μm ID, 0.4 μm)
Column 2: MXT-WAX (high polarity, 10 m, 180 μm ID, 0.4 μm)
Carrier gas flow rate: hydrogen 1.6 mL/min.
Flame ionization detector (FID) temperature: 260° C.
Injector temperature: 200° C.
Oven temperature: 40° C. (5 sec.), then raised at 1.5° C./sec. to 250° C. (90 sec.)
Injection time: 125 sec.
Trap temperature: 50° C. for adsorption, 240° C. for desorption
Trap time: 130 sec. for adsorption, 35 sec. for preheating The conditions for measurement samples can be set as detailed later in the Examples section.

Also, in the present invention, the contents of α-ionone, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol, and indole in the tea aroma composition can be measured using gas chromatography/mass spectroscopy (GC/MS). To be specific, the contents of the above aroma components can be measured under the conditions detailed below.

System:
  GC: GC7890B, produced by Agilent Technologies
  MS: 5977A, produced by Agilent Technologies
  HS: MPS, produced by Gestel
  Tube: Tenax TA, Carbon bx1000
  Column: HP-INNOWAX, 60 m×0.25 mm i.d., df=0.25 µm
  Temperature conditions: 40° C. (4 min.), then raised at 5° C./min. to 260° C.
  Carrier gas flow rate: He 1.5 mL/min.
  Injection method: Splitless
  Ion source temperature: 260° C.

The conditions for measurement samples can be set as detailed later in the Examples section.

In the present invention, when aroma components such as linalool and geraniol are present in the form of glucosidases, the contents of such aroma components, unless otherwise specified, refer to the contents of those aroma components alone, such as linalool alone or geraniol alone, excluding those of sugar moieties. Removal of glucosidic moieties (sugar moieties) can be performed using an appropriate sugar hydrolase.

The Brix value of the tea aroma composition of the present invention is not particularly limited, but is in any case in the range of from 0 to 0.50. As referred to herein, the "Brix value" refers to a value obtained by converting a refractive index measured at 20° C. using a sugar content meter, refractometer, etc. into a mass/mass percentage of sucrose in solution based on the conversion table published by ICUMSA (the International Commission for Uniform Methods of Sugar Analysis). The Brix may also be expressed in unit of "°Bx", "%" or "degree". In this invention, higher Brix values indicate higher contents of soluble solids in the tea aroma composition—the Brix value can be used as an index for the extent of concentration of a tea aroma composition. In this invention, the Brix value can be measured using a commercially available Brix meter. The tea aroma composition of this invention has a Brix value of preferably from 0.03 to 0.40, more preferably from 0.05 to 0.30, still more preferably 0.10 to 0.20.

The tea aroma composition of the present invention preferably has a pH of from 4.5 to 8.5 at 25° C. When the tea aroma composition of this invention has a pH within the aforementioned range, the tea aroma composition can exhibit excellent floral aroma, and becomes more easy to handle as an aromatizing agent for beverages and foods. The tea aroma composition of this invention has a pH of more preferably from 5.0 to 8.0, still more preferably from 5.5 to 7.5. The pH adjustment can be made, as appropriate, using a pH adjustor.

Since the tea aroma composition of the present invention can be produced through steam distillation of tea leaves, the tea aroma composition can comprise a tea leaf distillate. The tea aroma composition of this invention may be a tea leaf distillate per se, or may be a solution obtained by diluting or dispersing such a tea leaf distillate with a solvent such as water or an alcohol like ethanol or propylene glycol. The tea leaf distillate content in the tea aroma composition of this invention is not particularly limited, and is for example not less than 0.01 wt. %, not less than 0.1 wt. %, or not less than 1 wt. %, preferably not less than 5 wt. %, not less than 10 wt. %, or not less than 30 wt. %, more preferably not less than 50 wt. %.

The tea aroma composition of the present invention not only comprises the aforementioned components, but also can have added thereto other additives commonly used in beverages and foods, such as antioxidant, preservative, sweetener, enrichment, thickening stabilizer, emulsifier, dietary fiber, and quality stabilizer, to the extent that such additives do not impair the effects of the present invention.

The tea aroma composition of the present invention can be added to beverages and foods as it is or in the form of a dilution with water or the like. Examples of beverages include tea beverages, sport drinks, carbonated beverages, fruit juice beverages, milk beverages, and alcoholic beverages, with tea beverages being particularly preferred. Examples of tea beverages include non-fermented teas (e.g., green tea), semi-fermented teas (e.g., oolong tea), and fermented teas (e.g., black tea). Specific examples thereof include: steamed, non-fermented teas (green teas), such as Sencha (brewed green tea), Bancha (coarse green tea), Houji-cha (roasted green tea), Gyokuro (refined green tea), Kabuse-cha (shaded green tea), and Tencha (non-ground tea leaves used for Matcha); non-fermented teas including Kamairicha (pot-roasted green teas) such as Ureshinocha, Aoyagicha, and Chinese teas; semi-fermented teas such as Hoshucha, Tekkannon tea, and oolong tea; and fermented teas such as black tea, Awa-bancha, and puerh tea. The tea beverage in which the tea aroma composition of this invention is used is preferably a green tea. Beverages with the tea aroma composition of this invention added thereto can be provided as packaged beverages which are beverages packed in PET bottles, cans or other packages.

The tea aroma composition of the present invention can also be added to foods. Examples of such foods include confectionary foods, such as cakes, sponge cakes, candies, cookies, jellies, puddings, and chocolates, frozen desserts such as ice cream, ice candy, and sherbet; and snacks, regardless of whether they are Japanese or Western confectionaries. Also, the tea aroma composition of this invention can be used in breads or dairy products.

When the tea aroma composition of the present invention is added to a beverage or food, the amount of the tea aroma composition added can be determined, as appropriate, depending on, for example, the type of the beverage or food. The tea aroma composition of this invention can be added to a beverage or food so as to ensure that the content of the tea aroma composition in the beverage or food falls within the range of, for example, from 0.001 to 10 wt. % (w/w), preferably from 0.003 to 7.5 wt. % (w/w), more preferably from 0.005 to 5 wt. % (w/w), still more preferably from 0.01 to 3.5 wt. % (w/w).

Also, the amount of the tea aroma composition of the present invention added to a beverage or food can be determined using, as an index, the content(s) of at least one selected from the group consisting of linalool, geraniol, 2,4-heptadienal, and 2-methylbutanal. For example, the tea aroma composition of this invention can be added to a beverage or food so as to ensure that the linalool content in the beverage or food falls within the range of from 1 to 1000 ppb (w/w), preferably from 3 to 500 ppb (w/w), more preferably from 5 to 300 ppb (w/w), still more preferably from 10 to 200 ppb (w/w). For example, the tea aroma composition of this invention can be added to a beverage or food so as to ensure that the geraniol content in the beverage or food falls within the range of from 1 to 800 ppb (w/w), preferably from 3 to 400 ppb (w/w), more preferably from 5 to 200 ppb (w/w), still more preferably from 10 to 100 ppb (w/w). For example, the tea aroma composition of this invention can be added to a beverage or food so as to ensure that the total linalool and geraniol content in the beverage or food falls within the range of from 1 to 1000 ppb (w/w), preferably from 5 to 800 ppb (w/w), more preferably from 10 to 600 ppb (w/w), still more preferably from 20 to 400 ppb (w/w). For example, the tea aroma composition of this invention can be added to a beverage or food so as to ensure that the 2-methylbutanal content in the beverage or food falls within the range of from 0.1 to 500 ppb (w/w), preferably from 0.3 to 300 ppb (w/w), more preferably from 0.3 to 100 ppb (w/w), still more preferably from 1 to 50 ppb (w/w). For example, the tea aroma composition of this invention can be added to a beverage or food so as to ensure that the 2,4-heptadienal content in the beverage or food falls within the range of from 0.001 to 100 ppb (w/w), preferably from 0.01 to 50 ppb (w/w), more preferably from 0.05 to 30 ppb (w/w), still more preferably from 0.1 to 20 ppb (w/w).

(Production Method)

Hereunder, the method for producing the tea aroma composition of the present invention will be described. In another embodiment, this invention can be directed to a method for producing a tea aroma composition, the method comprising the steps described later in subsequent paragraphs.

The tea aroma composition of the present invention can be produced through the step of distilling tea leaves. Tea leaves used as a source ingredient are as described above in preceding paragraphs. In this invention, stems of Kukicha, Karigane, Tenbone, or the like can be used as a source ingredient.

The form of tea leaves used as a source ingredient is not particularly limited—fresh tea leaves, roasted tea leaves, or fermented tea leaves may be used. Before steam distillation is done, tea leaves may be heat treated or may be subjected to further steps such as grinding or moistening depending on the need.

The heat treatment of tea leaves before steam distillation can be performed, for example, in a state in which tea leaves are soaked in water. When tea leaves are soaked in water, the tea leaves may be stirred in a soaked state. Also, tea leaves may be ground before being soaked in water. When tea leaves are soaked in water, water can be used in an amount of, for example, from 0.1 to 20 times by weight, preferably from 1 to 15 times by weight, more preferably from 3 to 10 times by weight, relative to the weight of the tea leaves which is taken as 1. The temperature (e.g., water temperature) at which to heat tea leaves can be set to, for example, from 20 to 100° C., preferably from 30 to 80° C., more preferably from 35 to 70° C. The time of heating tea leaves (e.g., the time of soaking tea leaves in water) can be set to, for example, from 10 minutes to 10 hours, preferably from 30 minutes to 6 hours, more preferably from 1 to 4 hours, still more preferably from 1.5 to 3 hours.

Examples of the method for moistening tea leaves before steam distillation include soaking tea leaves in water, and spraying water on tea leaves with an atomizer or the like. When tea leaves are soaked in water, the tea leaves may be stirred in a soaked state. The amount of water used to moisten tea leaves is not particularly limited, and water is used in an amount of, for example, from 0.1 to 5 times by weight, preferably from 0.3 to 3 times by weight, more preferably from 0.5 to 2 times by weight, relative to the weight of the tea leaves which is taken as 1.

Distillation of tea leaves is performed typically using a steam distillation method. Steam distillation is a method in which steam is passed through a source material (tea leaves) and aroma components distilled out together with steam are aggregated by cooling. Exemplary modes of steam distillation that can be adopted include atmospheric steam distillation, vacuum steam distillation, and gas-liquid multistage countercurrent contact distillation (spinning cone column). In this invention, atmospheric steam distillation or vacuum steam distillation is preferably used, with atmospheric steam distillation being more preferably used. During the process of steam distillation, aroma components are distilled out in large amounts at an early stage of distillation and thereafter the amount of aroma components distilled decreases gradually. The timing of terminating distillation can be determined, as appropriate, depending on the desired amounts of aroma components, economic efficiency or the like. Steam distillation of tea leaves can be performed using a steam distillation apparatus known to skilled artisans.

Steam distillation of tea leaves is typically performed by a decoction type steam distillation method. The decoction type steam distillation is a method in which a source material (tea leaves) is heated in a state soaked in water and the generated steam is collected and cooled to obtain a distillate. During the process of decoction type steam distillation, tea leaves as a source material are soaked in water in an amount of, for example, from 0.1 to 20 times by weight, preferably from 1 to 15 times by weight, more preferably from 3 to 10 times by weight, relative to the weight of tea leaves which is taken as 1. The flow rate of steam used in the decoction type steam distillation can be set to, for example, from 5 to 50 kg/hr, preferably from 10 to 40 kg/hr, more preferably from 15 to 30 kg/hr. The pressure of steam used in the decoction type steam distillation is in the range of, for example, from 0.05 to 0.5 MPa, preferably from 0.1 to 0.4 MPa, more preferably from 0.15 to 0.3 MPa, in the mode of atmospheric steam distillation. The distillation temperature used in the decoction type steam distillation is not particularly limited, but is preferably 100° C., in the mode of atmospheric steam distillation.

In the steam distillation method, condensation is carried out for collecting a fraction. The condensation can be performed at a temperature of, for example, not more than 30° C., preferably not more than 25° C., more preferably not more than 20° C. The procedure for the condensation treatment is not particularly limited—for example, the condensation can be performed using a refrigerant for cooling. As the refrigerant, an antifreeze solution or the like can be used. The temperature of the refrigerant can be set to, for example, not more than 20° C., preferably not more than 15° C., more preferably not more than 10° C. The flow rate of the refrigerant used for condensation can be set to, for example, from 10 to 70 L/min., preferably from 15 to 50 L/min., more preferably from 20 to 40 L/min. The time of collecting a distillate can be determined, as appropriate, depending on the intended purpose, but is in the range of, for example, from 5 minutes to 2 hours, preferably from 10 minutes to 1 hour, more preferably from 15 to 45 minutes, after the start of collecting the distillate. In this invention, the fraction may be collected while the temperature of a tea aroma composition is held at 80 to 100° C. In this invention, when a distillate is collected by steam distillation at a weight percentage of, for example, about from 20 to 70% relative to the weight of a source material, a tea aroma composition with a Brix value of less than 1% can be obtained.

In the present invention, the tea aroma composition obtained in the aforementioned manner can be further subjected to a concentration step to enhance the concentrations of aroma components. By concentrating the tea aroma composition of this invention, a tea aroma composition with higher potency can be obtained, thereby leading to reduction of the amount of a tea aroma composition added to beverages and foods, and enabling addition of higher concentrations of aroma components to beverages and foods.

Concentration of a tea aroma composition is typically performed by a distillative concentration method. The distillative concentration can be performed by, for example, employing a procedure in which a tea aroma composition is placed in a still and boiled by heating from the bottom to collect aroma components distilled out together with steam. For the distillative concentration, an atmospheric distillative concentration method or a vacuum distillative concentration method can be employed. In this invention, the vacuum distillative concentration method is preferably employed. Distillative concentration of a tea leaf distillate can be performed using a distillator known to skilled artisans.

When distillative concentration of a tea aroma composition is performed by a vacuum distillative concentration method, the flow rate of steam can be set to, for example, from 0.1 to 80 kg/hr, preferably from 1 to 60 kg/hr, more preferably from 3 to 40 kg/hr. The pressure of steam used for heating during the vacuum distillative concentration is in the range of, for example, from 0.1 to 0.5 MPa, preferably from 0.15 to 0.4 MPa, more preferably from 0.2 to 0.3 MPa. The distillation temperature used in the vacuum distillative concentration is in the range of, for example, from 10 to 100° C., preferably from 20 to 70° C., more preferably from 35 to 55° C. The degree of pressure reduction employed in the vacuum distillative concentration can be set to, for example, from 0 to −0.101 MPa, preferably from −0.050 to −0.099 MPa, more preferably from −0.075 to −0.095 MPa, as expressed on a gauge pressure basis.

During the process of distillative concentration, like in the process of steam distillation as mentioned above, aroma components are distilled out in large amounts at an early stage of distillation and thereafter the amount of aroma components distilled decreases gradually. The timing of terminating distillation can be determined, as appropriate, depending on the desired amounts of aroma components, economic efficiency or the like. The concentration factor is determined at the time of terminating distillation. The condensation treatment for collecting a fraction distilled at the distillative concentration step can be performed at a temperature of, for example, not more than 30° C., preferably not more than 25° C., more preferably not more than 20° C. Like in the case of the condensation treatment at the steam distillation step as mentioned above, the procedure for the condensation treatment at the distillative concentration step is not particularly limited. For example, the condensation can be performed using a refrigerant for cooling. As the refrigerant, an antifreeze solution or the like can be used. The temperature of the refrigerant can be set to, for example, not more than 20° C., preferably not more than 15° C., more preferably not more than 10° C. The flow rate of the refrigerant used for condensation can be set to, for example, from 10 to 70 L/min., preferably from 15 to 50 L/min., more preferably from 20 to 40 L/min. The time of collecting a distillate at the distillative concentration step can be determined, as appropriate, depending on the intended purpose, but is in the range of, for example, from 2 minutes to 1 hour, preferably from 5 to 45 minutes, more preferably from 10 to 30 minutes, after the start of collecting the distillate. In this invention, by performing the distillative concentration step, a concentrated distillate can be collected at a weight percentage of from 3 to 20% relative to the weight of a tea aroma composition before concentration, or namely a tea aroma composition with a concentration factor of about from 5 to 30 times can be obtained.

Also, an operation called salting-out may be performed at the step of distillative concentration (preferably, vacuum distillative concentration). By performing the salting-out treatment, water molecules can be attracted by the polarity of a salt in a distillate placed in a still, thereby promoting the vaporization of organic compounds. The salting-out treatment can be performed by incorporating a salt into a distillate to be concentrated. For example, the salting-out can be performed by introducing a salt into a still before or during the distillative concentration treatment, or by adding in advance a salt to a distillate to be concentrated and subjecting the salt-containing distillate to the distillative concentration treatment.

The salt used for salting-out is typically sodium chloride. The amount of a salt used for salting-out is in the range of, for example, from 0.01 to 10 wt. % (w/w), preferably from 0.05 to 6 wt. % (w/w), more preferably from 0.5 to 3 wt. % (w/w), relative to the weight of a distillate before concentration.

The tea aroma composition of the present invention may be produced by taking a further step of treatment with activated carbon. By performing activated carbon treatment, the amounts of unwanted aroma components can be reduced. As referred to herein, the term "activated carbon" refers to a porous, carbon-based substance produced through activation of carbon-containing materials such as wood at high temperatures.

The shape of activated carbon used is not limited, but powder activated carbon is preferably used in the present invention. The average pore diameter of powder activated carbon is not particularly limited, and is in the range of, for example, from 0.3 to 30 nm, preferably from 0.5 to 20 nm, more preferably from 1 to 15 nm, still more preferably from 1 to 5 nm. The average pore diameter of powder activated carbon can be measured using a specific surface area/pore distribution measurement apparatus known to skilled artisans.

The origin of activated carbon is not particularly limited, and can be selected from, for example, wood-derived activated carbon, coconut husk-derived activated carbon, bamboo-derived activated carbon, rice husk-derived activated carbon, and the like. One type of these activated carbons may be used alone, or two or more types of them may be used in combination. In the present invention, wood-derived activated carbon and coconut husk-derived activated carbon are preferred, with wood-derived activated carbon being particularly preferred.

The procedure for activated carbon treatment is not particularly limited. For example, the treatment with powder activated carbon is performed by employing a procedure in which powder activated carbon is added to the tea aroma composition of the present invention and, after the mixture is left for an appropriate time, the powder activated carbon is removed using a filter or the like. The amount of powder activated carbon added, expressed in terms of relative concentration to the weight of the tea aroma composition, can be set to, for example, from 10 to 1000 ppm (w/w), preferably from 50 to 300 ppm (w/w), more preferably from 75 to 125 ppm (w/w). The time of contact of the tea aroma composition of this invention with powder activated carbon can be set to, for example, from 1 to 60 minutes, preferably from 3 to 30 minutes, more preferably from 5 to 20 minutes. During the process of contacting the tea aroma composition of this invention with powder activated carbon, stirring or other similar operations may be performed. The treatment temperature employed in the activated carbon treatment can be set to, for example, from 1 to 30° C., preferably from 2 to 20° C., more preferably from 3 to 10° C.

The tea aroma composition obtained in the aforementioned manner may have further added thereto different aroma components including, but not particularly limited to, linalool, geraniol, 2-methylbutanal, and 2,4-heptadienal. As mentioned above, the tea aroma composition of this invention can be added to beverages and foods, so that the floral aroma of the beverages and foods can be enhanced. For this reason, in another embodiment, this invention can be directed to a method for enhancing the floral aroma of a beverage or food, the method comprising a step of adding the tea aroma composition obtained through the aforementioned steps to the beverage or food.

EXAMPLES

Hereunder, the present invention will be described by way of working examples, but this invention is not limited to these examples.

1. Preparation of Tea Aroma Compositions (1) Preparation of a Tea Aroma Composition by Steam Distillation Fifteen kilograms of commercial Kukicha tea leaves were weighed out and mixed with 100 kg of water, and the mixture was held at 50° C. for 2 hours to effect heat treatment of the tea leaves. Next, the treated solution containing the tea leaves was placed in a steam still, and decoction type steam distillation was performed at a steam pressure of 0.25 MPa, a steam flow rate of 20 kg/hr, and a steam temperature of 100° C. (atmospheric pressure). Then, condensation was carried out at cooling refrigerant temperatures of 4° C. for supply and 6° C. for return, and at a refrigerant flow rate of 30 L/min., to collect a distillate. The time of distillate collection was set to 30 minutes after the distillate started to distill out. The amount of the distillate collected was 8 kg. This operation was repeated ten times to obtain a total of 80 kg of distillate (tea aroma composition).

(2) Activated Carbon Treatment

The tea aroma composition obtained at the aforementioned step was treated with activated carbon. To be specific, 8 g of wood-derived powder activated carbon (Shirasagi WP-Z; produced by Osaka Gas Chemicals Co., Ltd.) with an average pore diameter of 3 nm was added to 80 kg of the distillate, and the mixture was stirred with a stirrer for 10 minutes. Then, the activated carbon was removed from the distillate using a filter paper (ADVANTEC, No. 2). The treatment temperature used during the activated carbon treatment was set to 6° C.

(3) Vacuum Distillative Concentration

Eighty kilograms of the aforementioned tea aroma composition treated with activated carbon was placed in a still in two divided doses, each of 40 kg, and the interior of the still was depressurized to −0.09 MPa using a vacuum pump. The depressurized still was heated at a steam flow rate of from 5 to 15 kg/hr and a steam pressure of 0.25 MPa to raise the temperature of the distillate to 40 to 50° C. Then, condensation was carried out at cooling refrigerant temperatures of 4° C. for supply and 6° C. for return, and at a refrigerant flow rate of 31 L/min., to collect a distillate. The time of distillate collection was set to 15 minutes after the distillate started to distill out. The amount of the distillate collected was 4 kg in total (concentrated to 20-fold).

(4) Evaluation of Tea Aroma Compositions

All of the tea aroma compositions obtained by the different treatments mentioned above were felt to have excellent floral aroma. As a result of analyzing these tea aroma compositions, different aroma components were detected, such as linalool, geraniol, 2-methylbutanal, 2,4-heptadienal, α-ionone, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol, and indole. With the presence of linalool, geraniol, 2-methylbutanal, and 2,4-heptadienal being particularly focused among those aroma components, the concentrations of these four components in the different tea aroma compositions were measured by following the procedure described below.

<Calibration Curve>

Standard stock solutions (in ethanol solvent) were prepared so as to ensure that each of the aroma components of interest was present at a concentration of 1000 ppm. Each stock solution was prepared with pure water to concentrations of 0.004, 0.02, 0.05, 0.1, 0.2, and 0.5 ppm. 10 mL each of the prepared solutions was transferred into a 20 mL glass vial containing 3 g of sodium chloride, and the thus obtained samples were used for calibration curve plotting.

<Preparation of Analysis Samples>

The tea aroma compositions were diluted with pure water, as appropriate, to give a concentration that fell within the concentration range of the calibration curve, and 10 mL each of the diluted tea aroma compositions and 3 g of sodium chloride were placed in a 20 mL glass vial to thereby prepare analysis samples.

<Component Analysis>

The concentrations of the different aroma components were measured using a gas chromatographic analysis system (Flash GC Nose HERACLES II; produced by Alpha M.O.S. Japan K.K.).

(Sampling Parameters)

Incubation: 60° C. for 15 min.

Syringe: temperature: 70° C.; cleaning after injection: 90 sec.

Headspace injection: 5000 μL at 250 μL/sec.

(System Parameters)

Column 1: MXT-5 (slight polarity, 10 m, 180 μm ID, 0.4 μm)

Column 2: MXT-WAX (high polarity, 10 m, 180 μm ID, 0.4 μm)

Carrier gas flow rate: hydrogen 1.6 mL/min.

Flame ionization detector (FID) temperature: 260° C.

Injector temperature: 200° C.

Oven temperature: 40° C. (5 sec.), then raised at 1.5° C./sec. to 250° C. (90 sec.)

Injection time: 125 sec.

Trap temperature: 50° C. for adsorption, 240° C. for desorption

Trap time: 130 sec. for adsorption, 35 sec. for preheating

The results of the measurement of aroma component concentrations were as shown in the table given below.

TABLE 1

| | Tea aroma composition | | |
|---|---|---|---|
| | Steam distillation | Activated carbon treatment | Vacuum distillative concentration |
| Linalool | 14933 ppb | 14801 ppb | 249936 ppb |
| Geraniol | 12227 ppb | 6846 ppb | 91496 ppb |
| 2-Methylbutanal | 1400 ppb | 1436 ppb | 14712 ppb |
| 2,4-Heptadienal | 395 ppb | 110 ppb | 1138 ppb |

The concentrations of other aroma components were measured under the conditions detailed below. The results obtained were as shown in the table given below.

<Component Analysis>

Analysis samples prepared by the same procedure as mentioned above were loaded into a gas chromatography/mass spectroscopy system (produced by Agilent Technologies) to measure the concentrations of different aroma components by a multi-volatile method (MVM) using a MPS produced by Gerstel.

System:
  GC: GC7890B, produced by Agilent Technologies
  MS: 5977A, produced by Agilent Technologies
  HS: MPS, produced by Gestel
  Tube: Tenax TA, Carbon bx1000
  Column: HP-INNOWAX, 60 m×0.25 mm i.d., df=0.25 µm
  Temperature conditions: 40° C. (4 min.), then raised at 5° C./min. to 260° C.
  Carrier gas flow rate: He 1.5 mL/min.
  Injection method: Splitless
  Ion source temperature: 260° C.

TABLE 2

| | Tea aroma composition | | |
|---|---|---|---|
| | Steam distillation | Activated carbon treatment | Vacuum distillative concentration |
| α-Ionone | 0.08 ppm | 0.00 ppm | 0.25 ppm |
| β-Cyclocitral | 0.00 ppm | 0.00 ppm | 0.39 ppm |
| (z)-3-Hexenol | 1.62 ppm | 2.23 ppm | 13.15 ppm |
| 1-Penten-3-ol | 1.51 ppm | 2.23 ppm | 9.20 ppm |
| Nerolidol | 0.89 ppm | 0.18 ppm | 2.45 ppm |
| Hexanal | 0.22 ppm | 0.42 ppm | 4.35 ppm |

2. Study on the Ratio of Aroma Components in Tea Aroma Compositions

Based on the measurement results given above, a focus was placed on linalool, geraniol, and 2-methylbutanal, and in particular, a study was made on the presence and relative ratio of 2-methylbutanal. First, for the purpose of preliminary experiments, water dilutions of the tea aroma compositions obtained by the aforementioned procedure were compared with mixed solutions prepared by adding the different aroma component reference standards to water to give the same concentrations of aroma components as those found in the above dilutions, and as a result, it was confirmed that there was little difference between the water dilutions and the mixed solutions in terms of perceived floral aroma. Further, different mixed solutions prepared by adding varied concentrations of linalool and geraniol reference standards to water were investigated for their aroma, and the results found that there was no significant difference in perceived aroma among all of the mixed solutions prepared with different concentration ratios, and that little difference in aroma was observed at least within the range of linalool/geraniol concentration ratio (linalool:geraniol) of from 1:10 to 20:1.

After the prior confirmation was done as mentioned above, linalool, geraniol, and 2-methylbutanal reference standards were added to water to give such final concentrations as indicated in the table given below, whereby different concentrations of samples were prepared. Since the aroma component concentrations in the different reference standards were unknown, concentration measurements of the reference standards had been done by gas chromatography in advance. To be specific, since 2-methylbutanal was slightly soluble in water, the 2-methylbutanal reference standard acquired was dissolved in 3 to 100 times its weight of ethanol, and the obtained ethanol solutions were further diluted with 50 to 5000 times their weights of water, whereby samples for concentration measurement were prepared. The linalool, geraniol, and 2,4-heptadienal reference standards were diluted with 50 to 5000 times their weights of pure water to adjust their concentrations, as appropriate, to lie within the ranges of the calibration curves, whereby samples for concentration measurement were prepared. The gas chromatographic analysis was done by following the same procedure as mentioned above.

The different samples prepared using the reference standards were subjected to sensory evaluation by three or four panelists who were well trained in aroma evaluation. In this sensory evaluation, the extent of floral aroma felt from the samples was rated on a five-point scale (with half-point increments), and the ratings provided were averaged. In this evaluation, the different samples were rated on the basis of the rating for the control sample (sample 1-1) which was prepared without addition of 2-methylbutanal and was rated 3 points.
  1: No floral aroma is felt.
  2: Slight floral aroma is felt
  3: Floral aroma is felt
  4: Strong floral aroma is felt (excellent in floral aroma)
  5: Very strong floral aroma is felt (extremely excellent in floral aroma)

TABLE 3

| | A Linalool (ppb) | B Geraniol (ppb) | 2-Methylbutanal (ppb) | C/(A + B) | Rating |
|---|---|---|---|---|---|
| Sample 1-1 | 100 | 33 | 0.0 | 0.000 | 3.0 |
| Sample 1-2 | 100 | 33 | 2.5 | 0.019 | 3.5 |
| Sample 1-3 | 100 | 33 | 5.1 | 0.038 | 4.3 |
| Sample 1-4 | 100 | 33 | 7.2 | 0.054 | 4.5 |
| Sample 1-5 | 100 | 33 | 14.5 | 0.109 | 4.0 |
| Sample 1-6 | 100 | 33 | 18.3 | 0.138 | 4.0 |
| Sample 1-7 | 100 | 33 | 21.7 | 0.163 | 4.2 |
| Sample 1-8 | 100 | 33 | 25.0 | 0.188 | 3.8 |
| Sample 1-9 | 100 | 33 | 28.3 | 0.213 | 3.2 |
| Sample 1-10 | 100 | 33 | 28.9 | 0.217 | 2.5 |
| Sample 1-11 | 100 | 33 | 151.8 | 1.142 | 1.8 |
| Sample 1-12 | 100 | 33 | 253.1 | 1.903 | 1.5 |

As shown in the above table, it was found that when 2-methylbutanal was contained in samples, the samples were felt to have more excellent floral aroma, and that when the weight ratio of 2-methylbutanal content to total linalool and geraniol content (2-methylbutanal/(linalool+geraniol)) fell within the specified range, the extent of excellent floral aroma was further enhanced.

Next, sensory evaluation was made with the samples prepared by reducing the concentrations of the aroma components shown in the above table by 0.5 times or by increasing the aroma component concentrations by 2 times. The preparation and sensory evaluation of the samples were done by following the same procedures as mentioned above in previous paragraphs.

TABLE 4

| | A Linalool (ppb) | B Geraniol (ppb) | C 2-Methylbutanal (ppb) | C/(A + B) | Rating |
|---|---|---|---|---|---|
| Sample 2-1 | 50 | 16.5 | 0.0 | 0.000 | 3.0 |
| Sample 2-2 | 50 | 16.5 | 1.3 | 0.019 | 3.3 |

TABLE 4-continued

|  | A<br>Linalool<br>(ppb) | B<br>Geraniol<br>(ppb) | C<br>2-Methylbutanal<br>(ppb) | C/<br>(A + B) | Rating |
|---|---|---|---|---|---|
| Sample 2-3 | 50 | 16.5 | 3.6 | 0.054 | 4.3 |
| Sample 2-4 | 50 | 16.5 | 14.5 | 0.217 | 2.3 |
| Sample 2-5 | 50 | 16.5 | 75.9 | 1.142 | 1.7 |
| Sample 3-1 | 200 | 66 | 0.0 | 0.000 | 3.0 |
| Sample 3-2 | 200 | 66 | 5.1 | 0.019 | 4.3 |
| Sample 3-3 | 200 | 66 | 14.5 | 0.054 | 3.3 |
| Sample 3-4 | 200 | 66 | 57.8 | 0.217 | 2.0 |
| Sample 3-5 | 200 | 66 | 303.7 | 1.142 | 1.3 |

The results are as shown in the table given above. Similar tendencies were observed even when the concentrations of the aroma components were reduced by 0.5 times or increased by 2 times.

In addition, in this experiment, the effect of addition of 2,4-heptadienal as an aroma component was also investigated. To be specific, different samples having the same aroma component profile as sample 1-2 as shown above were prepared to give final 2,4-heptadienal concentrations of from 0.4 to 20 ppb, and were subjected to sensory evaluation for perceived aroma. As a result, it was found that when 2,4-heptadienal was added, the aroma of the samples was more likely to be felt to be milder and more lingering, and that as the concentration of 2,4-heptadienal increased, the aroma of the samples became better balanced and the floral aroma of the samples was felt to be more intense.

3. Effect of Tea Aroma Composition

A tea aroma composition (linalool: 56341 ppb, geraniol: 11913 ppb, 2-methylbutanal: 4261 ppb, and 2,4-heptadienal: 211 ppb) was prepared through activated carbon treatment and vacuum distillative concentration, and added to a commercially available tea beverage (Iyemon; produced by Suntory) for carrying out sensory evaluation. To be specific, the tea aroma composition was added to 200 mL of the tea beverage in varied amounts as shown in the table given below, and the prepared tea beverage samples were subjected to sensory evaluation by four panelists who were well trained in aroma evaluation. In this sensory evaluation, the tea beverage samples were evaluated by overall rating that included the extent of improvement in tea beverage quality achieved by addition of floral aroma, and the intensity of perceived floral aroma. The ratings were given on a five-point scale from 1 point (low score) to 5 points (high score) with half-point increments, and finally averaged. In this evaluation, the different tea beverage samples were rated on the basis of the rating for the control tea beverage (tea beverage 1) which was prepared without addition of the tea aroma composition and was rated 3 points.

TABLE 5

|  | Tea aroma composition | | |
|---|---|---|---|
|  | Amount<br>added<br>(µL) | Concentration<br>added<br>(v/v) | Rating |
| Tea beverage 1 | 0 | 0% | 3.0 |
| Tea beverage 2 | 180 | 0.09% | 3.6 |
| Tea beverage 3 | 357 | 0.18% | 4.3 |
| Tea beverage 4 | 714 | 0.36% | 4.9 |
| Tea beverage 5 | 1430 | 0.71% | 5.0 |

As shown in the table given above, it was found that by adding a tea aroma composition, adequate floral aroma was successfully added to tea beverages, and the quality of the tea beverages was significantly enhanced.

4. Brix Value Measurement

A tea aroma composition was prepared through steam distillation, and measured for Brix value and determined to have a Brix of 0.02. Further, this tea aroma composition was concentrated to varied concentrations as shown in the table given below using an evaporator, and the obtained concentrates were measured for Brix value. The measurement of Brix value was done using a digital refractometer (produced by Atago Co., Ltd.).

TABLE 6

| Initial<br>volume<br>(mL) | Collected<br>volume<br>(mL) | Concentration<br>factor | Brix |
|---|---|---|---|
| 150 | 6.9 | 22 | 0.08 |
| 150 | 1.7 | 91 | 0.10 |
| 150 | 18.8 | 8 | 0.08 |
| 150 | 1.0 | 150 | 0.09 |
| 150 | 1.4 | 107 | 0.12 |
| 150 | 1.1 | 136 | 0.17 |
| 500 | 1.1 | 455 | 0.16 |
| 464 | 1.5 | 309 | 0.17 |

The results are as shown in the table given above. All of the concentrates were found to have a Brix value of not more than 0.50.

The invention claimed is:

1. A tea aroma composition comprising linalool, geraniol, and 2-methylbutanal, and having a weight ratio of 2-methylbutanal content to total linalool and geraniol content of from 0.010 to 0.215, wherein the composition comprises a green tea leaf distillate.

2. The composition according to claim 1, further comprising 2,4-heptadienal.

3. The composition according to claim 1, further comprising at least one aroma component selected from the group consisting of α-ionone, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol, and indole.

4. A beverage or food comprising the composition according to claim 1.

5. The beverage or food according to claim 4, wherein the beverage or food is a beverage.

\* \* \* \* \*